United States Patent [19]

Hahn

[11] Patent Number: 6,002,693

[45] Date of Patent: Dec. 14, 1999

[54] METHOD AND SYSTEM FOR ROUTING MESSAGES IN A TELECOMMUNICATION NETWORK USING AN EXPANDED SIGNALLING LINK SELECTOR FIELD

[75] Inventor: Michael Hahn, Carp, Canada

[73] Assignee: Nortel Networks Corporation, Montreal, Canada

[21] Appl. No.: 08/868,995

[22] Filed: Jun. 4, 1997

[51] Int. Cl.⁶ .................................................. H04Q 3/12
[52] U.S. Cl. ............................................................ 370/466
[58] Field of Search ................................. 370/466, 467, 370/474

[56] References Cited

U.S. PATENT DOCUMENTS

| | | | |
|---|---|---|---|
| 5,757,895 | 5/1998 | Aridas et al. | 379/136 |
| 5,898,876 | 4/1999 | James | 395/200.81 |
| 5,930,348 | 7/1999 | Regnier et al. | 379/221 |

*Primary Examiner*—Huy D. Vu
*Assistant Examiner*—Dung Trinh

[57] ABSTRACT

A routing procedure is provided to operate in conjunction with a CCS7 telecommunication network that has been upgraded to accommodate messages having signalling link selection (SLS) field that has been expanded from a length of 5 bits to a length of 8 bits. Messages containing an SLS field with a length of 5 bits that are received at upgraded nodes in such a network are converted to 8 bits so as to take advantage of the increased traffic capacity and improved load sharing characteristics offered by upgraded nodes. The Origination Point Code field, and the Destination Point Code (DPC) field in the routing label of a message, as well as the link identification number of the incoming signalling link carrying the message are used to generate an 8 bit SLS code that maintains message sequencing and is uniformly distributed among available SLS codes. The conversion feature may also be automatically deactivated once the number of data packets received at a node containing 8-bit SLS codes reaches a predetermined threshold.

20 Claims, 8 Drawing Sheets

METHOD AND SYSTEM FOR ROUTING MESSAGES IN A TELECOMMUNICATION NETWORK USING AN EXPANDED SIGNALLING LINK SELECTOR FIELD

FIELD OF THE INVENTION

This invention relates to telecommunication switching networks, and more particularly to a method and system for routing messages in a telecommunication network that has been partially upgraded to accommodate a routing label having an expanded signalling link selector field.

BACKGROUND OF THE INVENTION

The CCS7 (also called Signalling System No. 7) signalling protocol provides a practical method for implementing sophisticated, network-based intelligent services by providing "out-of-band" signalling making use of a separate high-speed data link for call setup and routing. As the demand for network-based intelligent services such as calling number/name delivery, and automatic callback has increased, there was a recognition of the need to increase the traffic capacity and improve load balancing capabilities of the typical CCS7 network.

In response to this need, the standards bodies responsible for setting standards for CCS7 networks (ie. the American National Standards Institute (ANSI) and Bellcore™) have issued requirements to be met by CCS7 network providers to implement the expanded capacity. One of these requirements pertains to expanding the Signalling Link Selector (SLS) field in the routing label of a data packet from a length of 5 bits to a length of 8 bits, thereby enabling the number of links between nodes to increase from 8 to 16, and allowing for improved load sharing among communication links interconnecting the nodes making up a CCS7 network.

However, it is not anticipated that all nodes in a typical CCS7 network will be updated at the same time to support the new requirements. This means that there will be a period when only some nodes in a CCS7 network will functionally support 8-bit SLS, while others will only functionally support 5-bit SLS. With a properly formulated strategy for converting a 5-bit SLS to a 8-bit SLS, many of the benefits of 8-bit SLS will be realized, even though not all of the nodes in the network are capable of functionally supporting 8-bit SLS.

SUMMARY OF THE INVENTION

The present invention provides a telecommunication network having a plurality of nodes interconnected by communication links, and wherein each data packet includes a link selector field, a source node identification field, and a destination node identification field, and wherein each communication link has assigned to it an link interface unit number at a node, a method of converting a link selector field received at a node from a first format to an expanded format, the steps comprising:

a. manipulating the link selector field, the source node identification field, the destination node identification field, and the link interface unit number to calculate an expanded link selector field;

b. replacing the link selector field on the data packet with the expanded link selector field.

It is a general object of the present invention to provide a means for enabling nodes in a telecommunication network which have been upgraded to accommodate an expanded SLS field to route incoming messages containing a 5-bit SLS code to an outgoing link determined from an 8-bit SLS code. The invention allows a CCS7 network provider to gain most of the benefits of 8-bit SLS codes before all nodes have been updated to generate 8-bit SLS codes. These benefits include increased network capacity, and improved load sharing.

There is also disclosed a means for the automatic deactivation of the 5-bit to 8-bit SLS conversion strategy disclosed by the present invention.

DETAILED DESCRIPTION OF THE PREFERRED EMBODIMENT

Figure 1:
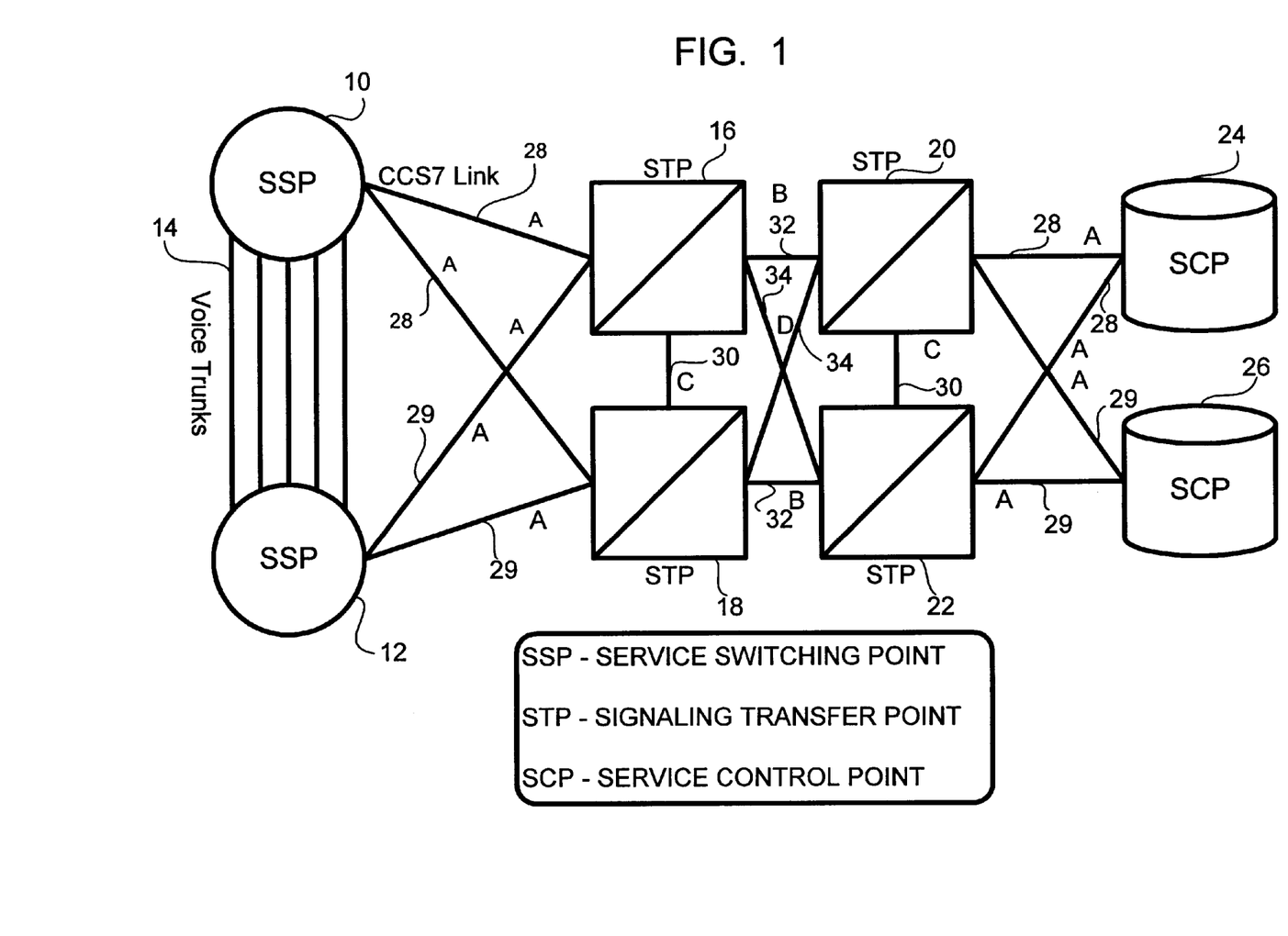
FIG. 1 is a block diagram of a typical CCS7 network configuration.

FIG. 1 is a block diagram of a typical CCS7 network configuration, showing two Service Switching Points (SSPs) 10, 12 connected by means of a multiplicity of voice trunks 14, four Signalling Transfer Points (STPs) 16, 18, 20, 22 in mated pair configuration, and two Service Control Points (SCPs) 24, 26, all of which are interconnected by signalling links 28, 29, 30, 32, 34. A signalling link is the most basic CCS7 entity, and is a direct physical connection between two CCS7 nodes. The messaging rate of a signalling link is either 56 kbit/s or 64 kbit/s.

SSPs 10, 12 are telephone switches which provide telephony services, and actually host lines and trunks containing voice and data traffic. Unlike other nodes in a CCS7 network, the STPs 16, 18, 20, 22 do not host any lines or trunks, and do not act as a source or ultimate destination for CCS7 messages. STPs 16, 18, 20, 22 are packet switches responsible for receiving incoming CCS7 messages from different SSPs 10, 12 or SCPs 24, 26, and routing the messages to the appropriate destination SSP or SCP. To ensure network availability, STPs 16, 18, 20, 22 are customarily deployed in mated pairs, so that if problems develop in one STP (for example 16), the mated STP (in this case 18) would provide an uninterrupted transfer of application and network management messages to all concerned nodes in the network. In FIG. 1, STPs 16, 18 are mated pairs. Similarly, STPs 20, 22 are mated pairs. STPs in a mated pair perform identical functions, and are redundant. Each SSP 10, 12 has two links 28, 29 (or sets of links), one to each STP of a mated pair. SCPs 24, 26 house databases with call routing information for advanced services such as 800 number service, credit card validation, etc.

Links 28, 29 are "A links". "A links" are links that interconnect an STP and either an SSP or SCP, and are exclusively used for delivering signalling messages to and from an SSP or SCP. Links 30 are "C links" which are links that interconnect mated pairs of STPs. Links interconnecting two mated pairs of STPs are referred to as either "B links" 32 or "D links" 34. The function of B links and D links is to carry signalling messages between STP nodes towards their intended destination.

All links 28, 29, 30, 32, 34 interface with nodes 10, 12, 16, 18 20, 22, 24, 26 by means of a CCS7 link interface unit (LIU7) (not shown), which is a hardware card residing at the node that connects the link to the node's computer processor. The LIU7s are responsible for enabling CCS7 messages to enter and leave the node. Each LIU7 residing at a node is assigned a unique 8-bit number (designated as LIU7#). The LIU7# is node-dependent, and is completely independent of the SLS code (described in further detail below), which is message dependent.

Figure 2:
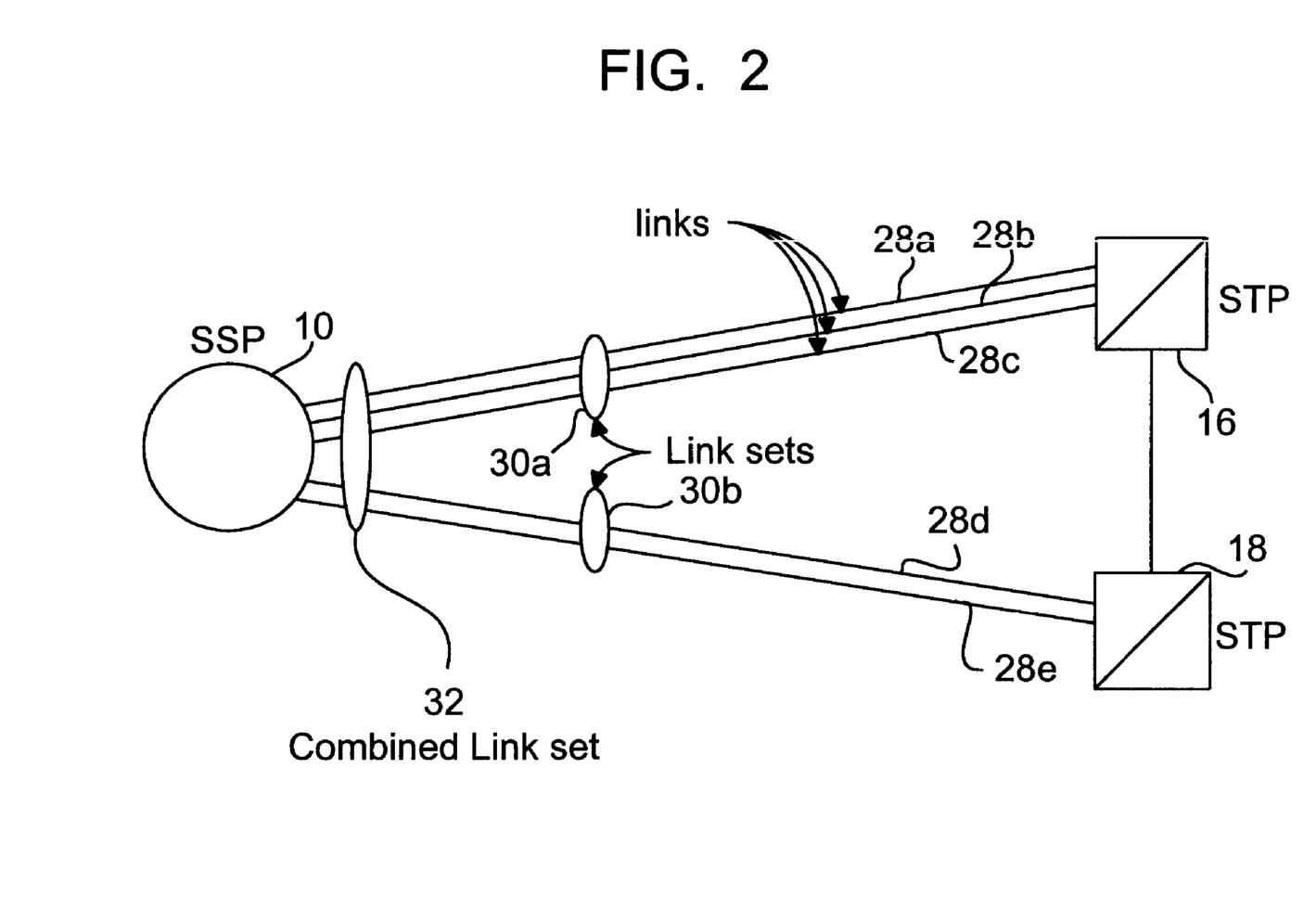
FIG. 2 is a block diagram showing CCS7 links, link sets, and combined link sets.

FIG. 2 is a block diagram of CCS7 links 28a, 28b, 28c, 28d, 28e, connecting SSP 10 to STPs 16 and 18. Link set 30a is comprised of links 28a, 28b, 28c, whereas link set 30b is comprised of links 28d and 28e. A link set is a logical grouping of links that go to the same destination. Links are grouped in link sets to provide redundancy and load sharing of the message traffic. There are a maximum of 16 links per link set. Combined link set 32 is comprised of link sets 30a, 30b. A load sharing collection of one or more link sets is called a combined link set.

Figure 3A:
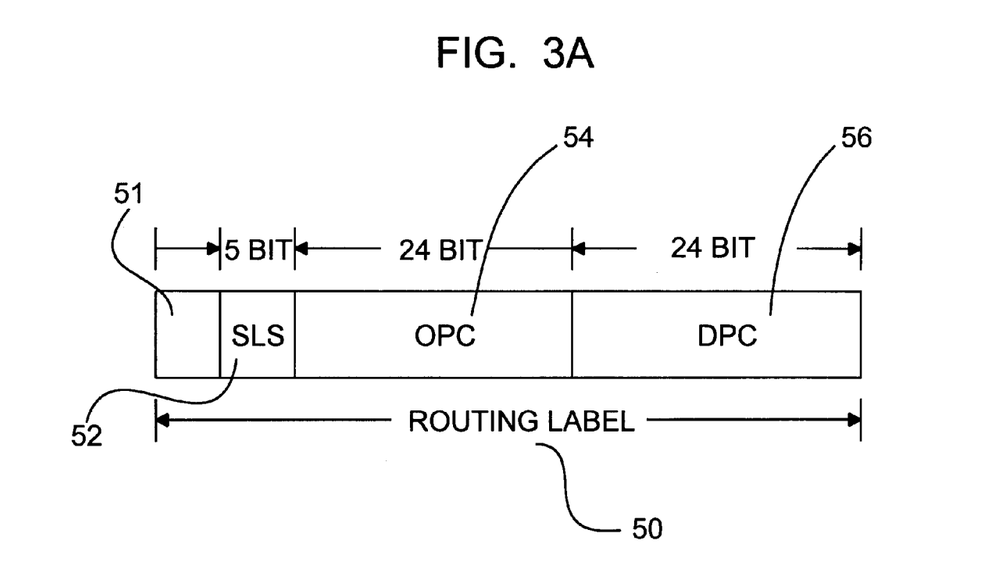
FIG. 3A is a block diagram of a routing label with 5-bit SLS field.

Signalling message handling functions are performed at each node in a CCS7 network, and are based on the part of the message called the "routing label." The routing label 50 illustrated in FIG. 3A consists of a 5-bit SLS field 52 (i.e. having a length of 5 bits), a 24-bit Origination Point Code (OPC) field 54, and a 24-bit Destination Point Code (DPC) field 56. The routing label 50 has three spare bits 51 adjacent to the SLS field 52.

Under the former ANSI standard for CCS7 networks, the length of the SLS field was set to 5 bits. Under the new ANSI standard, the length of the SLS field is being expanded to 8 bits (shown in FIG. 3B). Though the present disclosure describes in detail the procedure for converting a 5-bit SLS to an 8-bit SLS, persons skilled in the art will appreciate that under the current International Telecommunication Union (ITU) standard, the length of the SLS field is only 4 bits. A similar procedure could also be employed for ITU standardized CCS7 networks, or any other telecommunications network that employs a routing label analogous to the ones illustrated in FIGS. 3A and 3B.

A node in a CCS7 network will route a received message based on the DPC field 56 (which is the destination node identification field for the message) and the SLS field 52 (which is used to select a particular link to carry the message). Given the redundancies built into a CCS7 network, more than one link can usually be used to route a message from a source node (identified by the OPC 54) to a destination node (identified by a DPC). For messages that are required to be kept in sequence, the same SLS code is used to ensure that the messages are carried on the same link.

The OPC field 54 is used for network administrative functions, such as call set-up confirmation, that require information pertaining to the identity of the source node.

Different SLS codes 52 are assigned to different messages to provide congestion control, i.e. to ensure that the load is shared evenly throughout the links in a combined link set. Depending on the number of links in a combined link set, there may be more than one SLS code 52 assigned to a particular link. For example, if a node in a CCS7 network had a total of 32 SLS codes to distribute among its combined link set's links, and the combined link set had a total of 8 links, then each link would be assigned 4 SLS codes (total # of SLS codes/# of links in link set=# of SLSs per link). This assignment of SLS codes to links in a link set is known as the SLS load sharing method. However, if the combined link set only had a total of 6 links, then 4 links would be assigned 5 SLS codes, while 2 of the links would be assigned 6 SLS codes (4 links @ 5 SLS codes each+2 links @ 6 SLS codes each=32 links in the combined link set). In this case, 2 of the links would be carrying additional traffic. This uneven distribution of SLS codes would lead to uneven load balance of traffic between nodes in the network.

It is critical to the proper operation of a CCS7 network that SLS codes be assigned in a manner such that the load is shared as evenly as possible across the network. As the example above illustrates, the SLS load sharing method does not provide a fully balanced loading of signalling links in all cases.

Figure 3B:
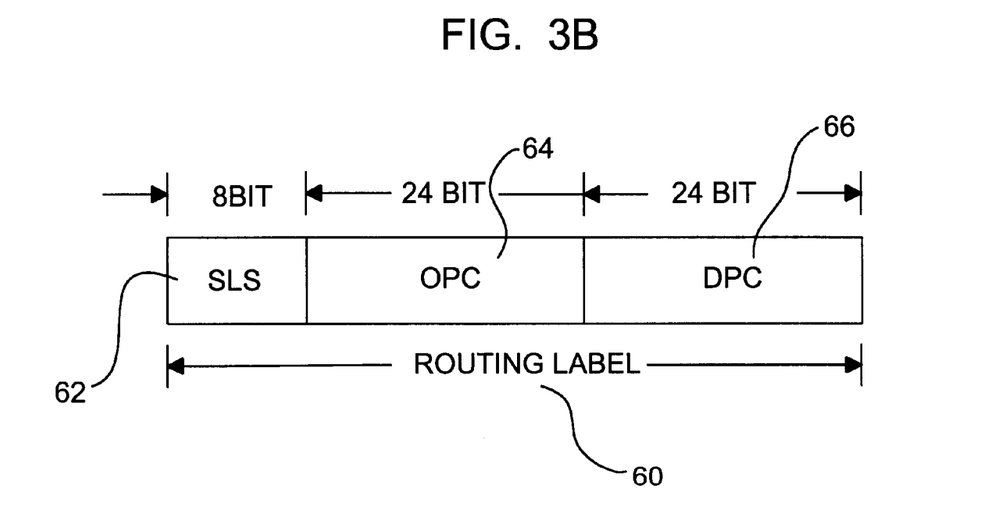
FIG. 3B is a block diagram of a routing label with 8-bit SLS field.

To increase the overall capacity of the network, and to allow for a more even load distribution on links, the new ANSI standard has expanded the length of the SLS field 62 in the routing label 60 from 5 bits to 8 bits (referred to as 8-bit SLS), as shown in FIG. 3B. The routing label 60 illustrated in FIG. 3B consists of an 8-bit SLS field 62, a 24-bit Origination Point Code (OPC) field 64, and a 24-bit Destination Point Code (DPC) field 66. The expansion of the SLS field 62 from 5 bits to 8 bits allows the maximum number of SLS codes to be increased from $2^5$, or 32 to $2^8$, or 256. This expansion allows the maximum size of a B or D link set to be 16 links compared to the previous value of 8. The expansion also allows a more even traffic distribution on links in a combined link set, especially after link failures. When an STP B/D combined link set is at maximum capacity (8 links in a B-link set, 8 links in a D-link set, or 16 links per combined link set) there is one SLS assigned per link. If a single link fails, then the one SLS assigned to the failed link will be assigned to one other link in the link set. This will cause a doubling of traffic on the link. For the same configuration running 8-bit SLS, each link will have 8 SLSs assigned. If one link fails, then 8 links will each be assigned one of the 8 SLSs that were assigned to the failed link. This will cause the traffic on these 8 links to increase by 12.5 (⅛).

Thus, with the 5-bit SLS field 52, traffic load between links in a link set could differ in some cases by a factor of 2. With the 8-bit SLS field 62, traffic load will differ by less than 25% in all cases. Table 1 shows the SLS codes available to be assigned from SSP nodes and STP nodes for 5-bit SLS fields and 8-bit SLS fields in a typical CCS7 network, as shown in FIG. 1:

TABLE 1

| SLS type | STP | | SSP | |
| --- | --- | --- | --- | --- |
| | Combined Link Set | Single Link Set | Combined Link Set | |
| | B | D | C | A |
| 5-bit | 8 SLS codes | 8 SLS codes | 16 SLS codes | 16 SLS codes in each link set |
| 8-bit | 64 SLS codes | 64 SLS codes | 128 SLS codes | 128 SLS codes in each link set |

Figure 4:
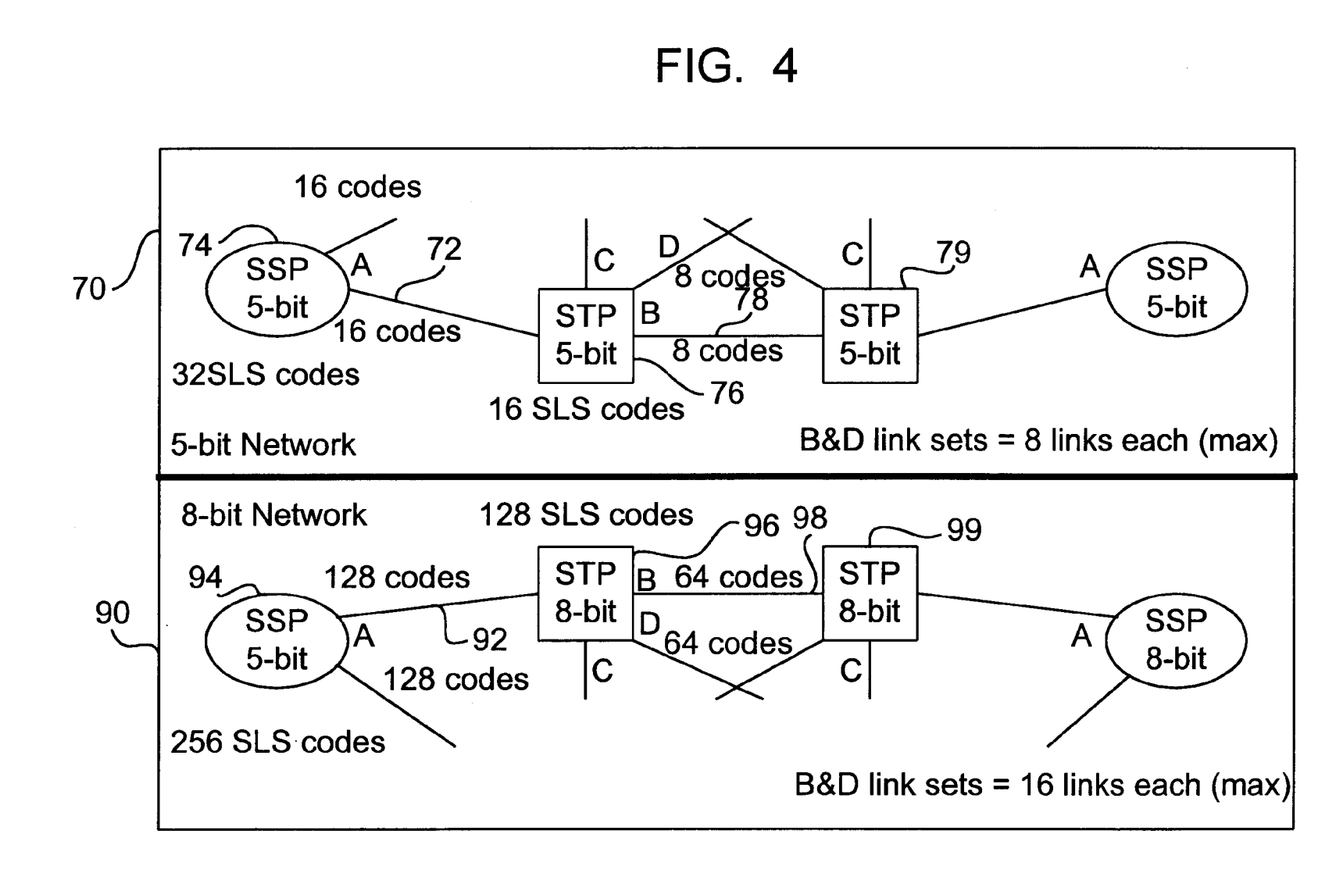
FIG. 4 is a block diagram showing the number of SLS codes available for mapping to each link set in the case of two CCS7 networks, the first accommodating only 5-bit SLS codes, and the second being upgraded to accommodate 8-bit SLS codes.

FIG. 4 illustrates a portion of two CCS7 networks (the upper network 70 designed to accommodate 5-bit SLS, and the lower network 90 designed to accommodate 8-bit SLS). Applying the data in the above table to a typical CCS7 network, 16 SLS codes can be assigned to the links making up link set 72 connecting SSP 74 and STP 76, whereas 128 SLS codes can be assigned to the links making up link set 92 connecting SSP 94 to STP 96. Similarly, in the 5-bit SLS network 70, only 8 SLS codes are assignable to the links making up link set 78 connecting STP 76 to STP 79, whereas in the 8-bit SLS network 90, 64 SLS codes are assignable to the links making up link set 98 connecting STP 96 to STP 99.

However, it is anticipated that not all CCS7 nodes will be upgraded at the same time to provide 8-bit SLS functionality. It is expected that at first, STP nodes will be upgraded, followed by SSP nodes, and SCP nodes. This means that during the transition period, some CCS7 nodes will be using only 5 bits of the SLS field, while others will be using all 8 bits. The load sharing method for the 8-bit SLS must allow nodes that use only 5-bit SLS to achieve as even load balance as possible.

Figure 5:
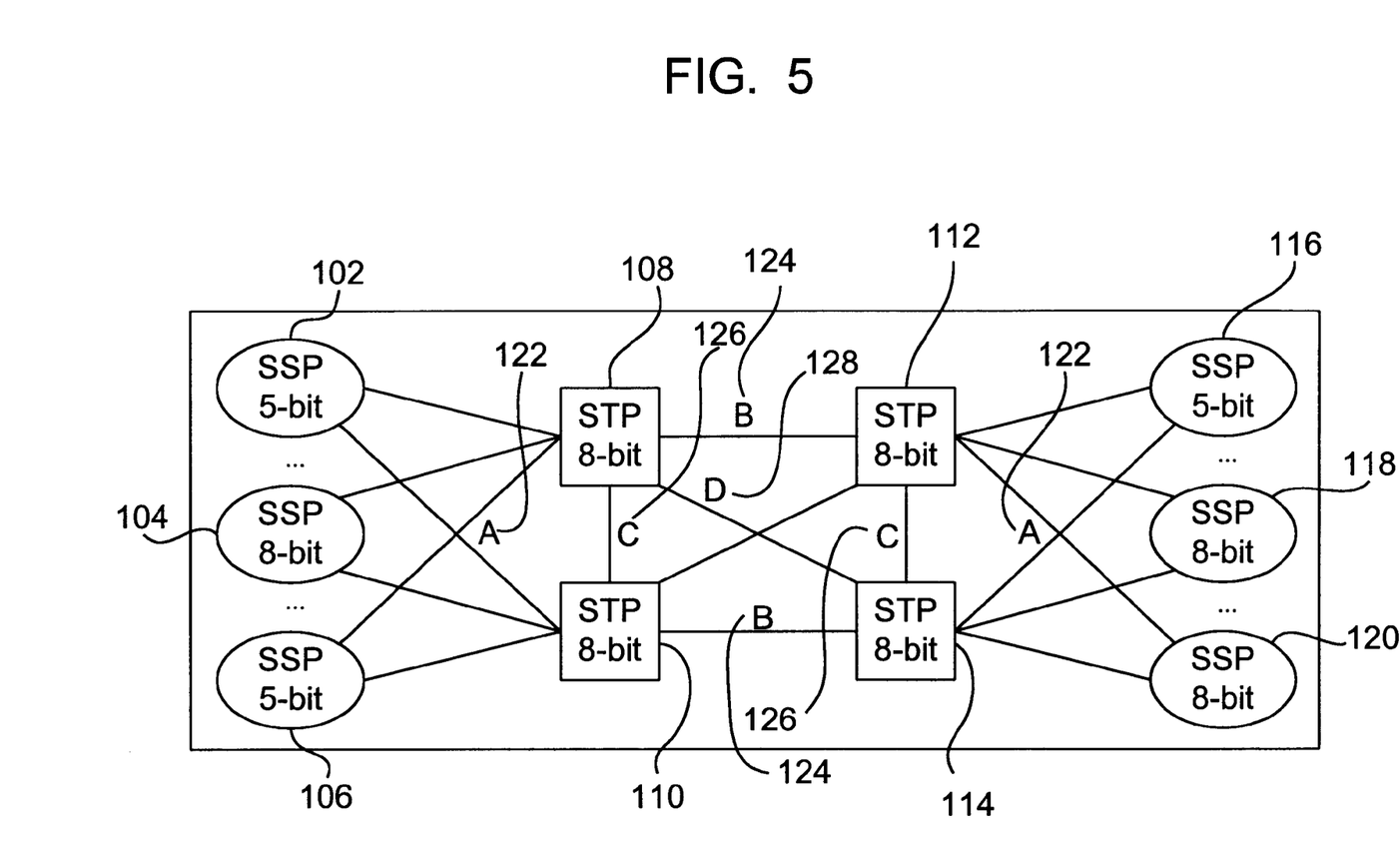
FIG. 5 is a block diagram of a typical CCS7 network that has not been upgraded to fully support 8-bit SLS codes.

FIG. 5 is a block diagram of a typical CCS7 network that has been partially upgraded to support 8-bit SLS. In this case, SSPs 104, 118, 120, and STPs 108, 110, 112, 114 have been upgraded to support 8-bit SLS fields, while SSPs 102, 106, 116 have not been upgraded, and are still generating SLS codes based on an SLS field having a length of 5-bits. If link set 124 and link set 128 have 16 links each, then messages originating with SSPs 102, 106 would only be routed on half of the links comprising these link sets due to the 5-bit SLS. This will lead to uneven load balancing, and unnecessary traffic congestion.

The purpose of the present invention is to enable an STP node to convert ingoing messages containing a 5-bit SLS to an 8-bit SLS such that messages can be routed over an expanded link set. The present invention converts a 5-bit SLS received at a node to an 8-bit SLS, which may change the routing of the message to take advantage of the additional links within the outgoing link set. Thus, the newly generated 8-bit SLS will be used to determine an outgoing link within the expanded outgoing link set. All other STP routing functions remain unchanged by the present invention. In the interim, the present invention will enable a CCS7 network, such as the one illustrated in FIG. 5, to achieve many of the benefits of 8-bit SLS routing even though not all nodes in the network are capable of producing messages containing 8-bit SLS fields.

Figure 6:
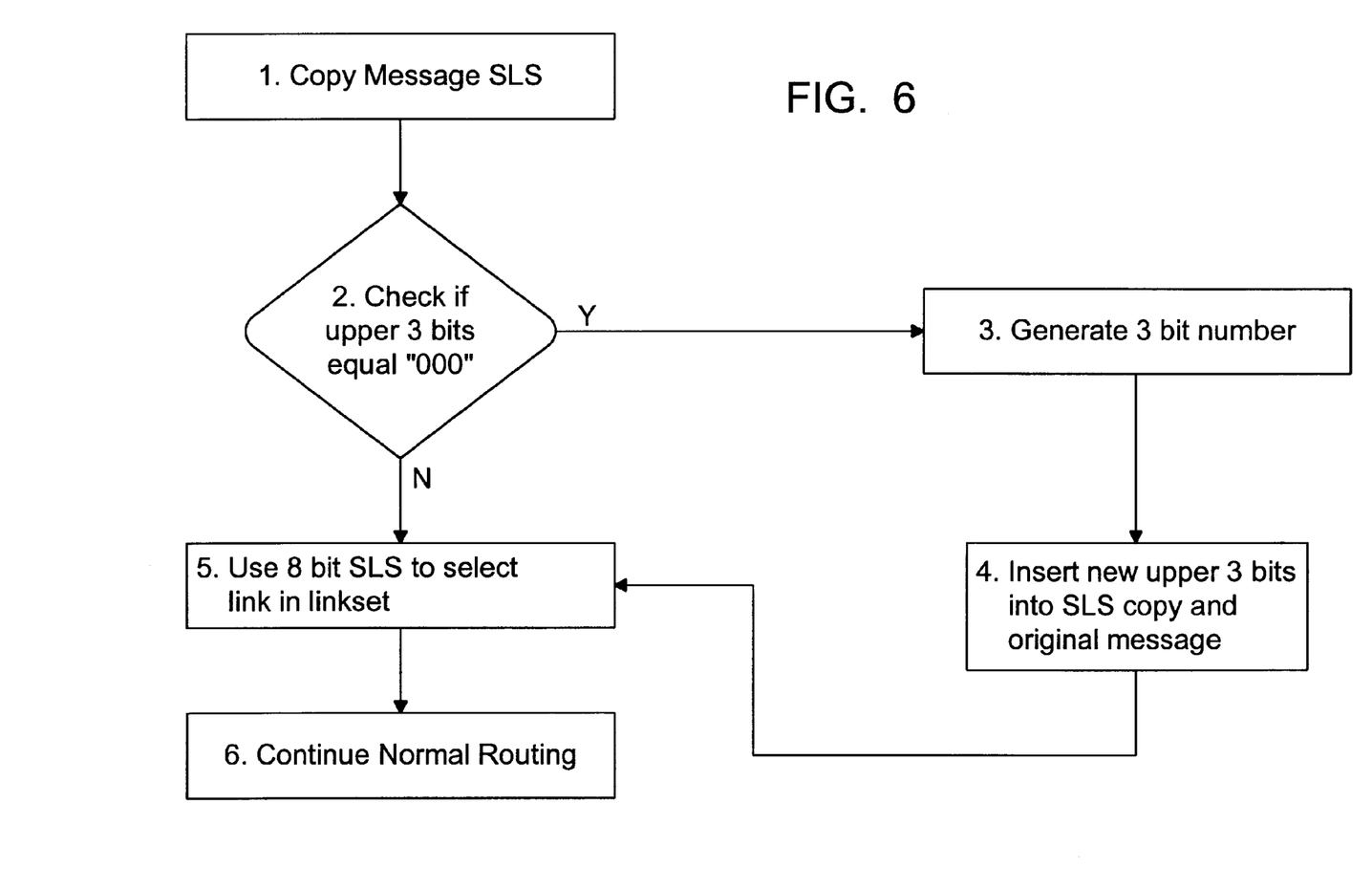
FIG. 6 is a flowchart showing the basic steps of the conversion strategy from 5-bit SLS codes to 8-bit SLS codes.

FIG. 6 is a flowchart showing the basic steps of the present invention. The present invention will convert an incoming 5-bit SLS to an outgoing 8-bit SLS. This will allow an STP upgraded to support 8-bit SLS to use the increased link set capacity to transmit messages toward the destination node. The basic steps of the present invention are:

1. Copy message SLS received at the node.
2. Determine if incoming message contains a 5-bit SLS. If not, proceed to step 5.
3. Generate a 3-bit number.
4. Insert 3-bit number into upper bits of messages's SLS field to generate an 8-bit SLS.
5. Use the 8-bit SLS to select a link in link set.
6. Continue with normal routing.

Referring to FIG. 3A, step 1 is implemented by examining the three spare bits 51 in the routing label. If they are populated with the digits "000", then the message is treated as a 5-bit SLS, and conversion steps 3 and 4 are performed. It is understood that some of the incoming 8-bit messages received at an STP will have the digits "000" in the upper three bits, and that consequently these 8-bit SLS will be unnecessarily converted to another 8-bit SLS. Persons skilled in the art will appreciate that this solution is not essential to the operation of the invention, in that additional logic could be programmed into the STP to ensure that an 8-bit SLS with the upper three bits set to "000" does not get converted to another 8-bit SLS.

The goal of steps 3 and 4 above is to generate an 8-bit SLS that provides even load balancing on all available links in the link set, and maintains message sequencing. Message sequencing means that a given message from a given source node destined for a given destination node with a given 5-bit SLS will always produce the same 8-bit SLS value. This ensures that all messages that must be maintained in sequence will travel from the source node to the destination node in sequence along the same links. The random assignment of a 3-bit number in step 3 above will not achieve this dual-purpose goal because message sequencing will not be maintained. Under ANSI CCS7, class 0 messages are those messages that do not require sequencing, whereas class 1 messages require that sequencing be maintained from source to destination throughout the network.

The present invention makes use of a number of data fields common to each message received at an STP to make the conversion from 5-bit SLS to 8-bit SLS. The use of a multiplicity of data fields provides a greater degree of randomness thereby achieving a uniform distribution in the range of "000" to '111' among the upper three bits of the 8-bit SLS field to be generated. The data fields used by the present invention are all identical for messages that require sequencing (ie. all non-Class 0 messages). Therefore, messages originating with a particular source node, destined for a particular destination node, with a specified 5-bit SLS will always produce the same 8-bit SLS value.

The following fields are used in the conversion from 5-bit SLS to 8-bit SLS, namely: (i) the 8 least significant bits of the OPC; (ii) the 8 least significant bits of the DPC; and (iii) the LIU7#. The data in each of these fields are hashed together using a hashing algorithm to form a new 8-bit SLS from the 5-bit SLS received by the STP. The use of these particular data fields by the hashing algorithm ensures that the dual-purpose goals of even load balancing and message sequencing are always met.

The preferred hashing algorithm employed by the present invention takes advantage of the properties of the exclusive OR (XOR) operation, which tends to produce results that are not skewed towards an overpopulation of 0's or 1's, as would have been the result with other operations, such as the AND operation, and the OR operation. The goal is to generate a result that is uniformly distributed over the full range of available SLS codes. The bit operations of exclusive OR are as follows:

exclusive OR $0 \oplus 0 = 0$ $0 \oplus 1 = 1$ $1 \oplus 0 = 1$ $1 \oplus 1 = 1$ The hashing algorithm employed in accordance with the present invention is as follows:

1. Compute X=(the 8 least significant bits of the OPC)$\oplus$ (the 8 least significant bits of the DPC);
2. Compute the result Y=X$\oplus$ (the LIU7# for the incoming signalling link);

3. Compute Z=MOD 8(Y) (equivalent to computing the AND result of Z and the binary equivalent of the number 7); and 4. Take the three least significant bits of Z to populate the upper three bits of the 5-bit SLS to form an 8-bit SLS.

What follows is an example of the above hashing algorithm for a message received at an STP containing the following fields (i) least significant bits of OPC=01001011; (ii) least significant bits of DPC=10100101; (iii) LIU #=01111000; and (iv) 5-bit SLS=11111:

| Step 1: | 01001011 (OPC) |
| xor | 10100101 (DPC) |
| | 11101110 (X) |
| Step 2: | 11101110 (X) |
| xor | 01111000 (LIU) |
| | 10010110 (Y) |
| Step 3: | 10010110 (Y) |
| mod 8 | 00000111 (8) |
| | 00000110 |
| Step 4: | 110 |
| populate | 11111 |
| | 11011111 |

The advantages of the above hashing algorithm is that it is fairly simple to implement in the STP, and does not require a significant amount of the STP processor's real time to calculate. It should be noted, however, that if one source node is producing an uneven amount of traffic to one destination node, as compared with other nodes in the network, the above algorithm may produce uneven traffic (i.e. the 32 values within a given upper 3-bit range of the 8-bit SLS).

Figure 7A:
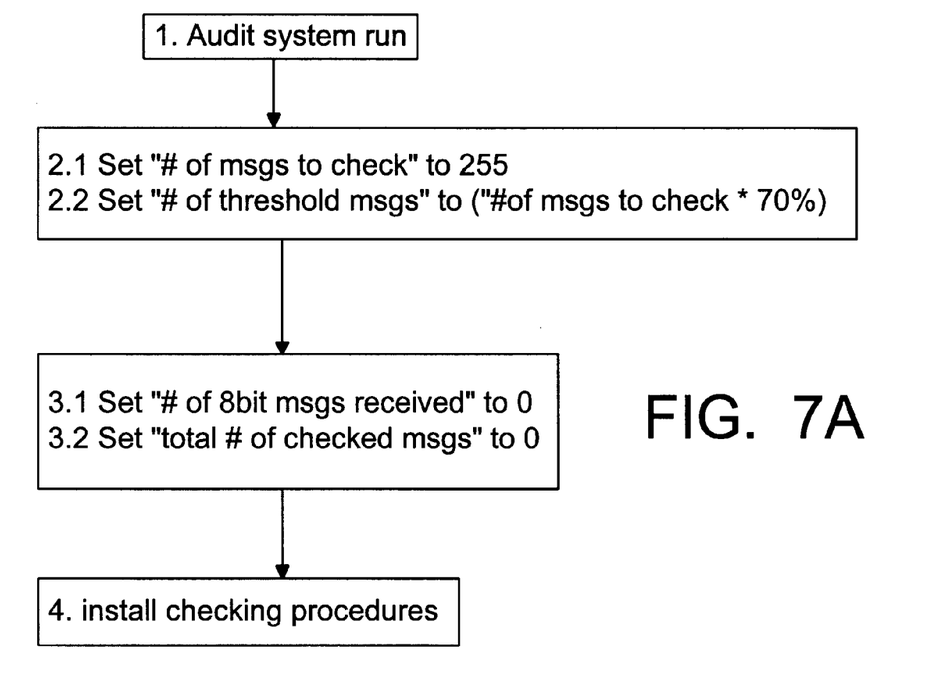
FIGS. 7A and 7B are flowcharts showing the steps employed to automatically de-activate the conversion strategy from 5-bit SLS codes to 8-bit SLS codes.
Figure 7B:
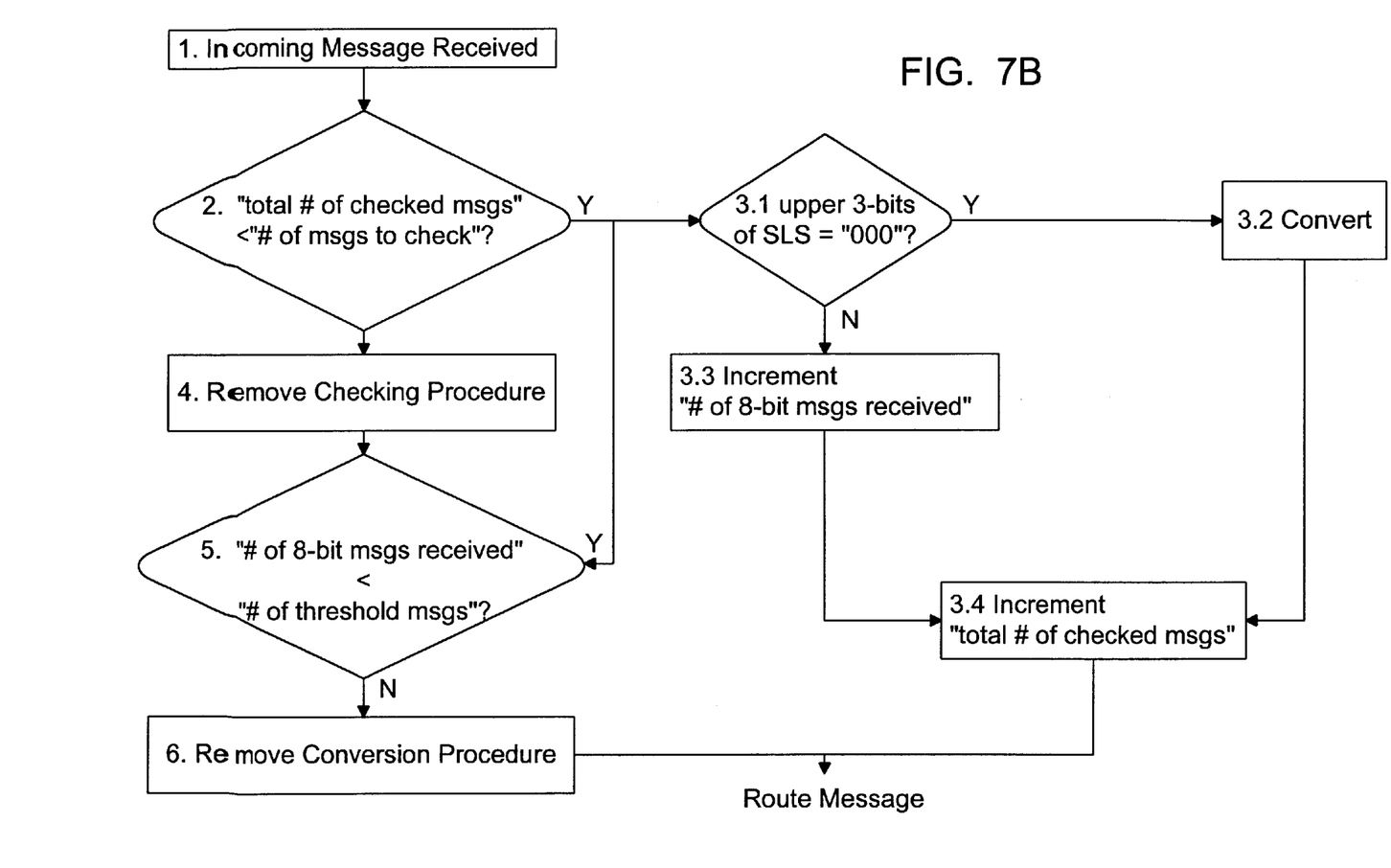

FIGS. 7A and 7B are flowcharts showing the steps to automatically de-activate the conversion step of the present invention. It is noted that if all nodes in a CCS7 network were upgraded to accommodate 8-bit SLS, then 20% of all messages in such a network would have the digits "000" assigned to the three most-significant bits of the SLS fields. As noted above, the present invention treats messages having the digits "000" in the routing label as a 5-bit SLS, and employs the conversion process described above to convert this 5-bit SLS to an 8-bit SLS.

The automatic deactivation feature of the present invention is designed to monitor all link traffic during a specified audit cycle (eg. 100 messages). At the end of the audit cycle, the node's computer processor will determine if conversion should be deactivated on the link. This is done by checking whether greater than 70% of the messages received on that link do not have the digits "000" as the three most-significant bits in the routing label. The 70% threshold is a specification requirement for CCS7 networks under Bellcore™ specification GR-82-CORE 4.2.3.3. If this test is met, then the link is treated by the node as an 8-bit SLS link, and the conversion process is turned off.

The benefits of this deactivation procedure is to enable the CCS7 node to automatically recapture conversion real-time when a link starts to receive only messages containing 8-bit SLS. Though some additional real-time for checking the messages is required during the audit cycle, this is outweighed by the benefits of recapturing the real-time employed in the conversion process after it is no longer required.

FIG. 7A is a flowchart showing the steps to install at an STP the automatic de-activation feature of the present invention. The process described in FIG. 7A is initiated periodically at an STP in the CCS7 network, and is triggered automatically by an auditing system at the STP. The initiation of this process resets all required data store that is used during the message monitoring run. The steps of this process are as follows:

1. The audit system is triggered to run automatically.

2.1 Set '# of msgs to check' to 255. '# of msgs to check' means the number of messages that will be monitored before a test will be made to determine if checking should be removed.

2.2 Set '# of threshold msgs' to ('# of msgs to check× 70%). '# of threshold msgs' means the number of messages that must be 8-bit SLS messages during the monitoring period (i.e. 255). This number is the number of messages to be checked multiplied by the percentage of messages that must be 8-bit SLS messages (i.e. 255×0.7=179).

3.1 Set '# of 8 bit msgs received' to 0. '# of 8 bit msgs received' means the number of received messages during the checking procedure which have been considered to be 8-bit SLS messages.

3.2 Set 'total # of checked msgs' to 0. 'total # of checked msgs' means the total number of received messages during the check period.

4. Install checking procedures which are more fully set out in FIG. 7B.

FIG. 7B shows the steps for auto deactivation of the conversion method of the present invention. This process is triggered by the arrival of an incoming messages whenever the checking procedures have been installed (see FIG. 7A). First, a decision is made to determine if enough messages have been monitored (step 2). If so, the checking procedures are removed from memory at the STP (step 4). A check is then made to determine if the conversion process should be removed by checking whether the number of received 8-bit SLS messages exceeds the threshold number (70% of total messages) (step 5). If the threshold is exceeded, then the conversion process is removed from the STP (step 6). If the number of checked messages is less than the number of messages to be checked, the appropriate counters are incremented, depending on whether the messages contains a 5-bit SLS, or an 8-bit SLS (steps 3.1–3.4). If the upper 3 bits of an SLS have a value of '000', then the message is considered to be a 5-bit SLS message (step 3.1).

We claim:

1. In a telecommunication network for transmitting data packets from a source node to a destination node, and having a plurality of nodes interconnected by communication links, and wherein each data packet includes a link selector field, a source node identification field, and a destination node identification field, and wherein each communication link has assigned to it a link interface unit number at a node, a method of converting a link selector field received at a node from a first format to an expanded format, the steps comprising:

a. manipulating the link selector field, the source node identification field, the destination node identification field, and the link interface unit number to calculate an expanded link selector field;

b. replacing the link selector field on the data packet with the expanded link selector field.

2. The method as claimed in claim 1 wherein step (b) comprises steps of:

b.1 extracting the link selector field, the source node identification field, and the destination node identification field from a data packet received at the node;

b.2 calculating a first result using the source node identification field, and the destination node identification field;

b.3 calculating a second result using the first result and the link interface unit number;

b.4 appending at least one of the digits of the second result to the link selector field to constitute an expanded link selector field.

3. The method as claimed in claim 1 wherein step (b) comprises steps of:

b.1 extracting the link selector field, the source node identification field, and the destination node identification field from the data packet;

b.2 calculating a first exclusive-or result corresponding to the source node identification field and the destination node identification field;

b.3 calculating a second exclusive-or result corresponding to the first exclusive-or result and the link interface unit number;

b.4 appending at least one of the digits of the second exclusive-or result to the link selector field to constitute an expanded link selector field.

4. The method as claimed in claim 1, wherein the length of the link selector field is 5 bits, and the length of the expanded link selector field is 8 bits.

5. The method as claimed in claim 2, wherein the length of the link selector field is 5 bits, and the length of the expanded link selector field is 8 bits.

6. The method as claimed in claim 3, wherein the length of the link selector field is 5 bits, and the length of the expanded link selector field is 8 bits.

7. The method as claimed in claim 1 wherein the length of the link selector field is 4 bits.

8. The method as claimed in claim 2 wherein the length of the link selector field is 4 bits.

9. The method as claimed in claim 3 wherein the length of the link selector field is 4 bits.

10. In a telecommunication network having a plurality of nodes interconnected by incoming communication links for transmitting data packets to the nodes, and outgoing signalling links for transmitting data packets from the nodes, and through which data packets are transmitted from a source node to a destination node, and wherein each data packet contains a link selector field corresponding to the incoming communication link, a source node identification field corresponding to the source node, and a destination node identification field corresponding to the destination, and wherein each incoming communication link has assigned to it a link interface unit number, a method of transmitting a data packet from a first node accommodating link selector fields in short format, to a second node accommodating link selector fields in long format, the steps comprising:

a. receiving the data packet at the first node from an incoming communication link, b. selecting an outgoing communication link associated with the short link selector field, c. transmitting the data packet on an outgoing communication link associated with the short link selector field, d. receiving the data packet at the second node, e. manipulating the short link selector field, the source node identification field, the destination node identification field, and the link interface unit number to calculate a long link selector field;

f. replacing the short link selector field with the long link selector field;

g. selecting an outgoing communication link associated with the long link selector field; and h. transmitting the data packet on the outgoing communication link associated with the long link selector field.

11. The method as claimed in claim 10 wherein step (e) comprises steps of:

e.1 extracting the short link selector field, the source node identification field, and the destination node identification field from the data packet;

e.2 calculating a first result using the source node identification field, and the destination node identification field;

e.3 calculating a second result using the first result and the link interface unit number;

e.4 appending at least one of the digits of the second result to the short link selector field to constitute a long link selector field.

12. The method as claimed in claim 10 wherein step (e) comprises steps of:

e.1 extracting the short link selector field, the source node identification field, and the destination node identification field from the data packet;

e.2 calculating a first exclusive-or result corresponding to the source node identification field and the destination node identification field;

e.3 calculating a second exclusive-or result corresponding to the first exclusive-or result and the link interface unit number;

e.4 appending at least one of the digits of the second exclusive-or result to the short link selector field to constitute a long link selector field.

13. The method as claimed in claim 10 wherein the length of the short link selector field is 5 bits, and the length of the long link selector field is 8 bits.

14. The method as claimed in claim 11 wherein the length of the short link selector field is 5 bits, and the length of the long link selector field is 8 bits.

15. The method as claimed in claim 12 wherein the length of the short link selector field is 5 bits, and the length of the long link selector field is 8 bits.

16. The method as claimed in claim 10 wherein the length of the short link selector field is 4 bits.

17. The method as claimed in claim 11 wherein the length of the short link selector field is 4 bits.

18. The method as claimed in claim 12 wherein the length of the short link selector field is 4 bits.

19. The method as claimed in claim 10 further comprising the steps of:

i. selecting a sample set of data packets, and for each data packet in the set:

i.1 comparing the length of the short link selector field to a predetermined length;

i.2 computing the percentage of short link selector fields that are equal to a predetermined length;

i.3 de-activating the operation of steps a–h when the percentage exceeds a threshold value for the entire set.

20. A node in a telecommunication network interconnected by communication links for transmitting data packets, wherein each data packet includes a link selector field, a source node identification field, and a destination node identification field, and wherein each communication link has assigned to it a link interface unit number at a node, said node comprising:

a processor coupled to a communication link for receiving a data packet, manipulating the link selector field, the source node identification field, the destination node identification field, and the link interface unit number to calculate an expanded link selector field, and replacing the link selector field with the expanded link selector field.

* * * * *